Figure 1:
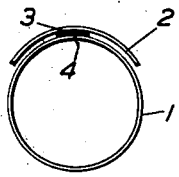
Figure 2:
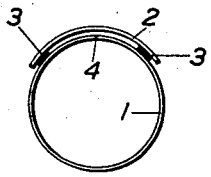
Figure 3:
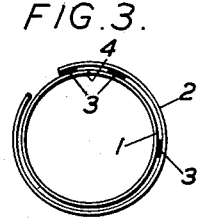

July 17, 1956

C. W. K. MAYSMOR ET AL 2,754,784

MANUFACTURE OF A METAL TUBE WHICH MAY FORM PART OF AN ELECTRIC CABLE

Filed Feb. 12, 1952

3 Sheets-Sheet 1

INVENTOR
C.W.K Maysmor
S. Page  G.R. Ward
BY  G.H. Webster

Webb Meckey & Burden
ATTORNEY

July 17, 1956     C. W. K. MAYSMOR ET AL     2,754,784
MANUFACTURE OF A METAL TUBE WHICH MAY
FORM PART OF AN ELECTRIC CABLE
Filed Feb. 12, 1952
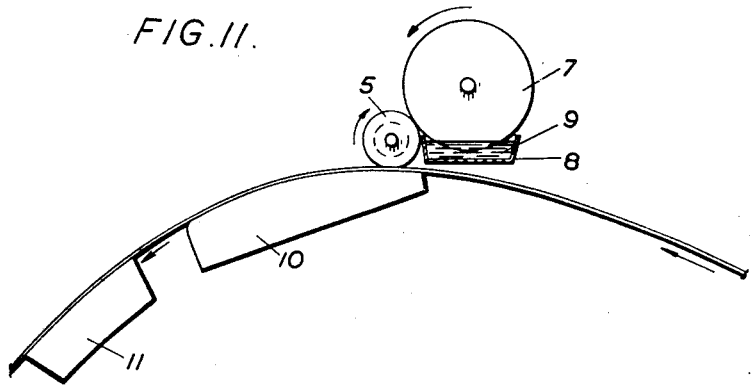
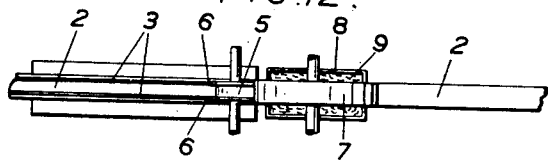
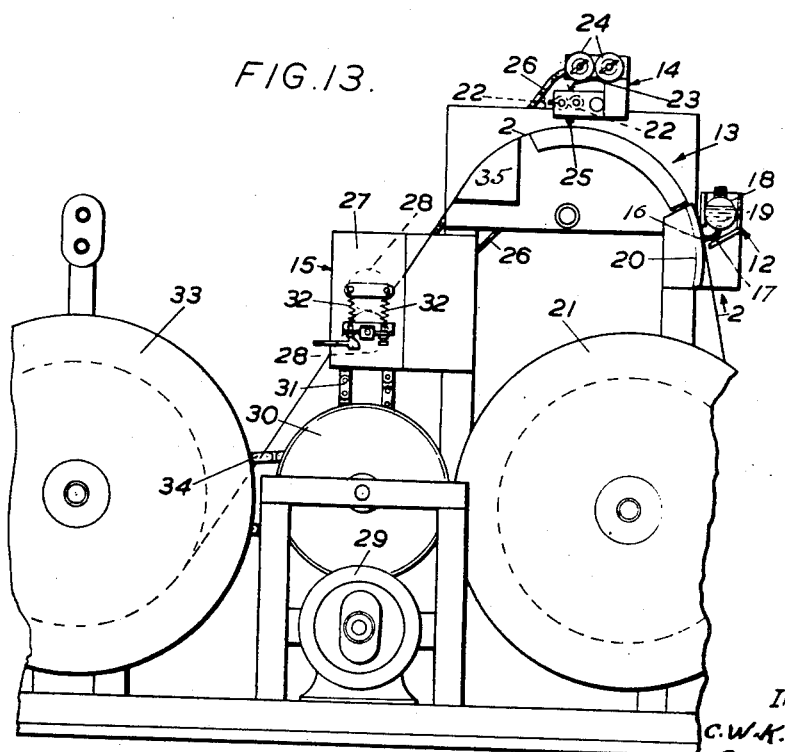

July 17, 1956

C. W. K. MAYSMOR ET AL 2,754,784

MANUFACTURE OF A METAL TUBE WHICH MAY
FORM PART OF AN ELECTRIC CABLE

Filed Feb. 12, 1952

3 Sheets-Sheet 3

INVENTOR
C.W.K. Maysmor
S. Page  G.R. Ward
BY G.H. Webster
Webb Mackey + Burden
ATTORNEY

United States Patent Office 2,754,784
Patented July 17, 1956

2,754,784

MANUFACTURE OF A METAL TUBE WHICH MAY FORM PART OF AN ELECTRIC CABLE

Charles William Kinsey Maysmor, Roby, Sidney Page, Liverpool, George Richard Ward, Wallasey, and George Harry Webster, Broadgreen, Liverpool, England, assignors to British Insulated Callender's Cables Limited, London, England, a British company Application February 12, 1952, Serial No. 271,088

Claims priority, application Great Britain February 19, 1951

11 Claims. (Cl. 113—33)

This invention relates to a method of making a metal tube which may form part of an electric cable, being, for instance, the outer conductor of a co-axial cable or a screen, or sheath, which encloses the conductor, or conductors, and the insulating material of a cable. In this method the tube is made by the progressive transverse bending of two metal tapes. By transverse bending we mean bending to impart a curvature in a direction transverse to the length of the tape. One of these tapes, which will be termed the inner tape, is bent to a tubular form in which its edges abut one another. It is held in this condition by the other tape, which will be termed the outer tape, by progressively transversely bending it over the inner tape and soldering the outer tape to the inner tape along a continuous strip on each side of the butting edges of the inner tape.

The outer tape may be of such a width that when bent round the inner tape the edges nearly meet, forming an approximately complete enclosure. Such a width is not essential, however, and it may suffice in some constructions to have the outer tape only wide enough to form a cover strip extending over the joint of the inner tape and the lines of soldering. Intermediate widths may also be used. The outer tape may be secured completely in position by the soldering when the strips of soldering are located at or near the two edges of the outer tape. In other cases a binder strip helically lapped over the outer tape may be employed.

The present invention is concerned with this soldering of the inner surface of the outer tape to the outer surface of the inner tape. In accordance with it one of the two tapes is prepared by depositing a coating of solder metal on each of one or more narrow strips of the tape, while the tape is flat, that is before transverse bending takes place. The inner tape is bent transversely to a tubular form in which its edges abut one another and the outer tape is applied to the transversely bent inner tape, the strip coating or coatings or solder on one of the two tapes facing the other of the two tapes. As this assembly is taking place, flux is applied to the solder coated strip or strips of the surface of the prepared tape or to a part of parts of the surface of the other tape that will become contiguous with such solder coated strip or strips. After the application of the outer tape, heat is applied to the assembly in the region of the solder coated strip or strips to melt the solder. The outer tape is held in place during the heating and afterwards until the solder has set. This heating may be followed by immediate cooling to ensure rapid setting of the solder.

Figure 4:
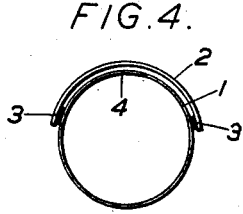
Figure 5:
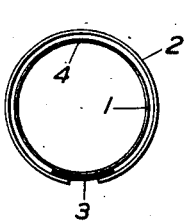
Figure 6:
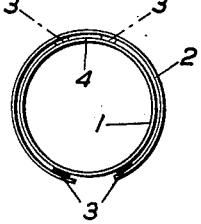
Figure 8:
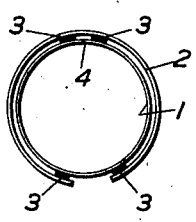
Figure 9:
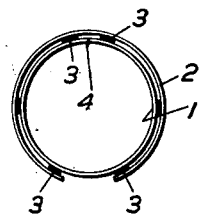
Figure 10:
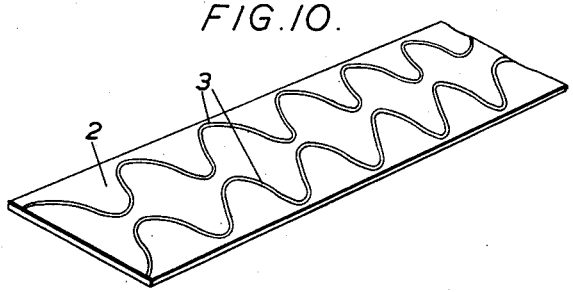
Figure 14:
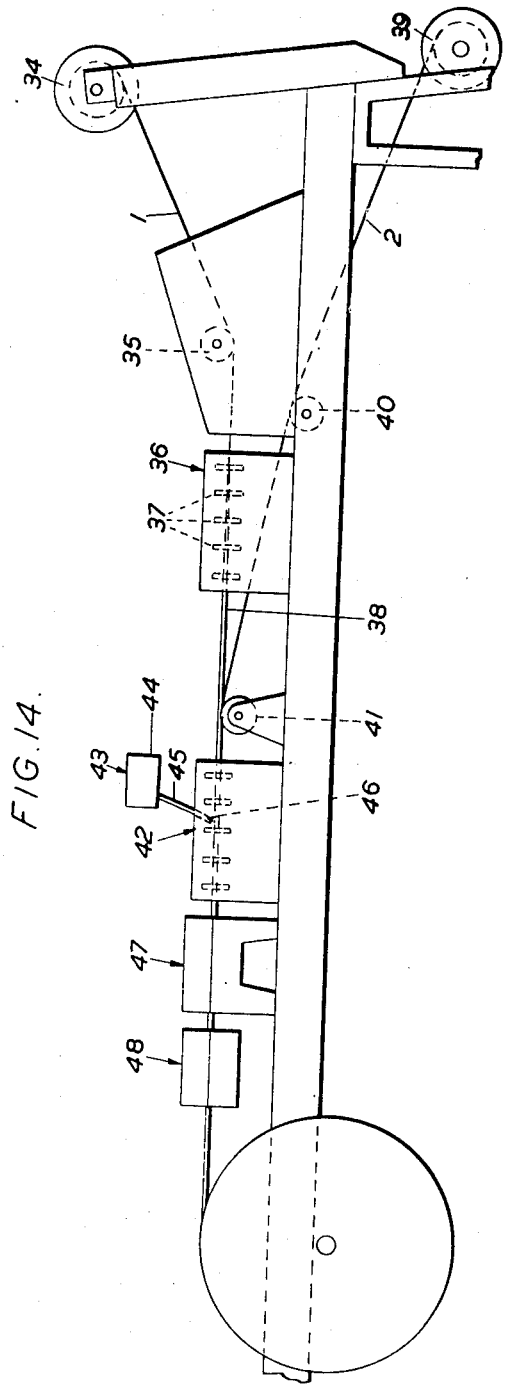

The invention will be more fully described with the aid of the accompanying diagrammatic drawings wherein Figures 1–9 are cross-sections of examples of tubes, showing various locations of the solder strips for uniting the inner and outer tapes, Figure 10 is a perspective view showing a length of one of the tapes of the tube shown in Figure 6 before being bent transversely, Figure 11 is an elevation, and Figure 12 a plan, of apparatus for carrying out one method of applying lines of solder metal to a surface of the inner or outer strip before bending it transversely, Figure 13 is an elevation of apparatus for carrying out a second method of applying lines of solder metal to a surface of the inner or outer strip before bending it transversely, and Figure 14 is an elevation of apparatus for carrying out the method of tube manufacture with which the present invention is concerned.

Figure 7:
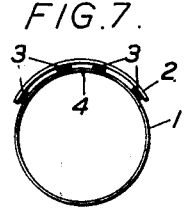

As will be seen from Figure 1–9 inclusive, the one or more narrow strips of solder 3 employed to unite the transversely bent outer tape 2 of the inner tape 1 bent transversely to a tubular form in which its edges 4 abut one another, may be given various positions. Where the solder is applied to the outer tape 2, a single strip may, as shown in Figure 1, be located partly to one side and partly to the other side of the joint between the abutted edges 4 of the inner tape 1, or two or more strips may be comparatively close together at any point in the width of the tape provided that the tape is so applied to the inner tape as to bring one or more of the strips 3 on one side of the abutted edges 4 of the inner tape 1 and one or more of the strips on the other side of those edges, as shown for instance in Figure 2 and 3. The strips 3 may in some cases be more widely spaced and be located near the edges of the outer tape 2, as shown in Figure 4. In such case the strip coatings may be applied to the outer tape 2 or to the inner tape 1. Where the edges of the outer tape are near one another, a single strip coating of solder applied to the outer surface of the inner tape may be used, as shown in Figure 5. In some cases two strips may be used each of which takes a sinuous path along the length of the inner or outer tape, for instance, as shown in Figure 6 and, more clearly, in Figure 10, so that they vary in position between the edges of the outer tape 2 and the abutting edges of the inner tape 1 as they progress longitudinally of the tube, with the object of obtaining a closer mechanical association between the two layers of tape and a finished tube having improved bending characteristics. In other cases the outer tape 2 may have deposited on it a coating of solder metal on each of two narrow strips in the central part of the tape and one on a narrow strip near each edge of the tape, as shown in Figures 7 and 8, whereby both edges of each tape are securely held and the tendency of the tube to deform when bent is reduced. As shown in Figure 9 a further strip of coating may be located between each marginal strip and the two central strips. This further strip may be of sinuous form. It will of course be appreciated that the thickness of the strips of solder 3 on the inner or outer tapes has been very much exaggerated for purposes of illustration and that the thicknesses of both inner and outer tapes have also been exaggerated, but to a lesser degree, for the same reason. Usually the thickness of the strip coatings of solder will be of the order of 1 mil (.025 mm.).

In general we prefer to apply the solder along one or more narrow strips of the outer tape as this reduces the risk of the coating or coatings being damaged during the operation of transversely bending the tape to shape.

The coating of solder metal on each of one or more narrow strips of the appropriate surface of the inner or outer tape may be produced by applying metal in powder form admixed with a sufficiently adhesive liquid or semi-liquid consisting of or containing a flux, along a line of the tape and then heating the mixture on the tape. Alternatively, the coating or coatings may be produced by applying flux to one surface of the tape along one or more paths or strips parallel to the edges of the tape or not, heating the tape and applying solder metal to the fluxed strip or strips of the surface of the heated tape by feeding an elongated element, e. g. a wire or rod, of solder metal endwise towards each of the hot fluxed strips of surface of the tape whilst the hot tape is caused to travel forward in the direction of its length. Where a sinuous strip coating is required the wire or rod of solder will be reciprocated in a lateral direction relative to the tape as the tape travels forward.

In the first of these methods the mixture is applied in a quantity sufficient to give a coating of solder suitable for joining the tapes together, the coating having, for instance, a thickness of 1 mil. The liquid or semi-liquid part of the mixture may consist of a flux with or without a solvent or other vehicle with a viscous or glutinous addition so that the mixture is sufficiently sticky to hold the powdered solder metal in place from the time of application until the heat treatment has taken place. Depending on the nature of the flux and the other substances used the heat of soldering may be sufficient to drive off the whole of the non-metallic part of the mixture or it may leave a residue. In the latter case if this residue is of an undesirable nature the tape may be subjected to washing to effect its removal.

The stimultaneous deposition of the solder and flux is preferably effected as a continuous process in which the tape moves steadily forward receiving the solder and glutinous liquid or semi-liquid and then passing to a heating device, which is preferably a heated surface over and in contact with which the tape runs, the solder being on the face of the tape which does not touch this device.

If the consistency of the mixture is appropriate the deposition may be effected by the apparatus shown in Figures 11 and 12 by passing the tape, e. g. the tape 2, under a roller 5 having an appropriate number of projecting rims 6, each of the width of a required strip of coating and so located as to run on the parts of the tape required to receive the coating, these rims being of rubber or other suitable material for carrying the liquid or semi-liquid mixture and being fed as by an applicator roller 7 dipping into a bath 8 containing the mixture 9. From the roller 5 the tape passes over a heated convexly curved shoe 10 which melts the solder and drives off the liquid or semi-liquid component of the mixture, and then over a water-cooled shoe 11 which cools the strip sufficiently to set the solder. The means for imparting a steady forward movement to the strip are not shown in Figures 11 and 12 but they may be of the form described with reference to and shown in Figure 13.

In the second of the two ways of producing one or more line coatings of solder metal on the inner or outer tape, the application of flux to and the deposition of the solder on one surface of the tape is effected as a continuous process in which the tape is moved steadily forward past a flux applicator and past a heating device and an associated solder feeding device which feeds one or more wires or rods of solder endwise towards the tape at a rate co-ordinated with the rate of forward movement of the tape, to maintain contact between the wire or rod and the tape and control the rate of deposition of solder.

This may be effected by an appropriate form of apparatus of which an example is shown in Figure 13. Essentially it comprises a flux applicator 12, a heater 13, a solder-feeding device 14 and tape-advancing means 15.

The flux applicator 12 is designed to work with a flux of liquid form, for instance an aqueous solution of a fluxing medium which is driven off when the tape is heated. It comprises a number of wicks 16, one for each line of solder. One end of each wick is held in a tube 17 leading from a vessel 18 containing liquid flux 19 and the other end of each of which brushes against a selected strip of the surface of the metal tape, e. g. the tape 2, as it moves forward over a guiding support 20 as it is drawn off from a supply coil 21.

The heater 13 consists of a heated metal surface over and in contact with which the tape runs, after leaving the flux applicator 12. This surface is of convex arcuate form so that by maintaining appropriate tension in the travelling tape 2, it is held in good contact with the heater as it travels over it, without having to apply pressure to the fluxed surfaces, and by so doing running the risk of contaminating them.

The solder feeding device 14 is located at the trailing end of the heater 13, that is to say, where the tape 2 is hottest. It comprises a pair of feed rolls 22 between which the requisite number of wires or rods 23 of solder pass from a pair of supply reels or bobbins 24 to and through a corresponding number of tubular guides 25 which closely approach the fluxed strips of the surface of the hot tape 2. These feed rolls 22, which may be of rubber or be rubber surfaced, are driven at a peripheral speed that is co-ordinated with but substantially lower than the speed of travel of the tape moving past the solder feeding device. They may be driven by means of a chain drive 26 from the tape-advancing means 15.

The tape-advancing means 15 comprises a frame 27 supporting a pair of rolls 28 the lower of which is driven by an electric motor 29 through a gear box 30 and a chain drive 31. The upper roll is an idle roll which is urged towards the driven roll by pairs of tension springs 32 which are adjustable to vary the pressure exerted by the rolls on the tape 2 passing between them and are readily releasable to facilitate "threading-up." From the rolls 28 the tape passes on to a take-up reel 33 driven through the gear box 30, chain drive 34 and a slipping clutch (not shown) by the motor 29 driving the haul-off device 15.

On leaving the heater 13 the tape is preferably cooled rapidly. This may be done by passing it over an artificially cooled convexly arcuate cooling plate 35 or by means of a water spray or air blast or by immersion in liquid coolant. The use of a water spray or of a liquid coolant may serve to wash off any flux residue present.

The process of shaping the inner tape 1 to tubular form and applying to it the prepared tape 2 and soldering the two tapes together, may be carried out in apparatus of the form shown in Figure 14. The inner tape 1 is drawn off from a supply reel 34 and guided by a pulley 35 towards a transverse bending device 36 comprising a set of apertured metal plates 37 which are spaced apart in the direction of travel of the tape 1. The apertures in these plates are of progressively decreasing size, that of the final plate having a diameter corresponding to the external diameter of the tube 38 formed by the transversely bent inner tape 1. The prepared outer tape 2 is drawn off from a supply reel 39 and, guided by pulleys 40 and 41, applied to the underside of the transversely bent inner tape 1 which it meets at a point between the transverse bending device 36 and a second transverse bending device 42 of corresponding construction which bends the outer tape 2 round the tube 38 formed by the bent inner tape. As the tape 2 is being closed in over the inner tape, flux in liquid form is applied to a part or parts of the inner tape with which the lines of solder on the outer tape will be brought into engagement and/or to the parts of the outer tape to which the lines of solder have been applied. This is done by a flux applicator 43 which preferably consists of a vessel 44 containing flux and a tube or tubes 45 leading out of the vessel and each carrying a wick 46 which is wiped by the surface of the tape in the region to be coated. In place of a wick, a brush may be used or the flux may be applied by roller, as described earlier with reference to the preparation of the outer tape 2. On leaving the second transverse bending device 42 the tube 38 passes through a heating device 47 which may take the form of a hot die or a hot roll or rolls. This applies sufficient heat to melt the ribbon-like coatings of solder on the inner surface of the outer tape 2 and holds the outer tape down on to the inner. On leaving the heater 47 the tube passes through a forced cooling device 48 where the films of solder solidify and unite the inner and outer tapes along the lines along which the coatings of solder were applied.

The same apparatus may serve to carry out the process of shaping a prepared inner tape to tubular form and applying to it an outer tape and soldering the two together by melting ribbon-like coatings of solder on the outer surface of the inner tape.

It will be appreciated that instead of the process of applying ribbon-like coatings of solder to the inner or outer tape taking place as a separate preparatory operation, as has been described, it may proceed concurrently with the main operation of shaping and assembling the strips, the solder-applying apparatus being inserted at some convenient point in the path of the tape 2 between the supply bobbin 39 and the point of application of the tape 2 to the pre-shaped inner tape 1 or in the path of the tape 1 between the supply bobbin 34 and the transverse bending device 36. It will also be appreciated that where it is required to manufacture transversely corrugated tubing, the tape to be prepared by depositing on it strip coatings of solder will be provided with transversely extending corrugations after the application of the lines of solder.

Where either or both layers of the tubing to be manufactured are to be of a metal, e. g. steel, which will not solder easily, we may also prepare both the inner tape and the outer tape by depositing a coating of solder metal on each of one or more narrow strips of each tape before bending the tape transversely to tubular shape, taking care so to locate the deposits on the two tapes that the deposits are brought into juxtaposition when the two tapes are assembled together to form finished tubing.

What we claim as our invention is:

1. A method of making a metal tube by progressively transversely bending an advancing metal tape to a tubular form in which its edges abut and holding it in such condition by progressively transversely bending a second advancing metal tape over the first said tape and soldering the outer tape to the inner tape along a continuous strip on each side of the abutting edges of the inner tape, characterised in that one of the two tapes is prepared for soldering it to the other by depositing an adherent coating of solder metal on at least one narrow strip of the tape before transversely bending it, that the outer tape is so applied to the inner tape that each marginal edge of the one tape overlies at least a part of at least one narrow strip of solder on the other tape, that, as the outer tape is being so applied to the inner tape, flux is applied to one of said tapes in the region of said coating of solder on one of said tapes, and that heat is applied to the assembly of inner and outer tapes in the region of the said coating of solder to melt the solder, the outer tape being held in place during this application of heat and afterwards until the solder has set, the coating of solder being so thin and the quantity of flux applied being so small that the soldering of the inner and outer tapes is effected along at least one continuous narrow strip extending the length of the tube on each side of the abutting edges of the inner tape.

2. A method of making a metal tube by progressively transversely bending an advancing metal tape to a tubular form in which its edges abut and holding it in such condition by progressively transversely bending a second advancing metal tape over the first said tape and soldering the outer tape to the inner tape along a continuous strip on each side of the abutting edges of the inner tape, characterised in that the outer tape is prepared for soldering it to the inner tape by depositing an adherent coating of solder metal on each of two narrow strips of the outer tape before transversely bending it, that the prepared outer tape is applied to the inner tape to bring one of the solder coated strips on one side of the abutting edges of the inner tape and the other on the opposite side, that, as the outer tape is being so applied to the inner tape, flux is applied to one of said tapes in the region of each coating of solder on said outer tape, and that heat is applied to the assembly of inner and outer tapes in the region of each coating of solder to melt the solder, the outer tape being held in place during this application of heat and afterwards until the solder has set, the coating of solder being so thin and the quantity of flux being so small that the soldering of the inner and outer tapes is confined to two narrow bands extending the length of the tube.

3. A method of making a metal tube by progressively transversely bending an advancing metal tape to a tubular form in which its edges abut and holding it in such condition by progressively transversely bending a second advancing metal tape over the first said tape and soldering the outer tape to the inner tape along a continuous strip on each side of the abutting edges of the inner tape, characterised in that the outer tape is prepared for soldering it to the inner tape by depositing an adherent coating of solder metal on each of two narrow strips in the central part of the tape and on a narrow strip near each edge of the tape before transversely bending it, that the prepared outer tape is applied to the inner tape to bring one of the two solder coated strips in the central part on one side of the abutting edges of the inner tape and the other on the opposite side, that, as the outer tape is being so applied to the inner tape, flux is applied to one of said tapes in the region of each coating of solder on said outer tape, and that heat is applied to the assembly in the region of each coating of solder to melt the solder, the outer tape being held in place during this application of heat and afterwards until the solder has set, the coatings of solder being so thin and the quantity of flux applied being so small that the soldering of the inner and outer tapes is confined to four narrow bands extending the length of the tube.

4. A method of making a metal tube by progressively transversely bending an advancing metal tape to a tubular form in which its edges abut and holding it in such condition by progressively bending over it a second advancing metal tape, one of the two tapes having an adherent coating of solder deposited on at least one narrow strip of its surface which faces the other tape and the two tapes being so placed relative to one another that each marginal edge of one of said tapes overlies at least a part of at least one narrow strip of solder on the other tape, applying flux to one of the two juxtaposed surfaces of the inner and outer tapes in the region of the coating as the outer tape is being applied to the inner, and first heating then cooling the assembly of inner and outer tapes in the region of the coating while the outer tape is held in place, the coating of solder being so thin and the quantity of flux being so small that by said heating and cooling the two tapes become soldered together along at least one continuous strip on each side of the abutting edges of the inner tape, wherein the coating of solder is produced by applying along a line of the tape powdered solder metal admixed with a vehicle which comprises a flux and then heating the mixture on the tape to melt the powdered solder and form a coating united with the tape, the vehicle being sufficiently adhesive to hold the solder in place from the time of its application until its union with the tape.

5. A method as claimed in claim 4, wherein the deposit of solder metal and flux on the tape is effected as a continuous process in which the tape moves steadily forward receiving first a mixture of solder metal and flux and then an application of heat.

6. A method of making a metal tube as claimed in claim 5, in which the mixture is applied to the tape by passing the tape under a roller having at least one projecting rim adapted to carry the mixture and transfer it to the tape to form at least one line of deposited mixture.

7. A method as claimed in claim 4, wherein the strip is heated by running it over a heated convex surface, with that surface of the tape, opposite the surface carrying the deposit, in contact with the heated surface.

8. A method of makng a metal tube by progressively transversely bending an advancing metal tape to a tubular form in which its edges abut and holding it in such condition by progressively bending over it a second advancing metal tape, one of the two tapes having an adherent coating of solder deposited on at least one narrow strip of its surface which faces the other tape and the two tapes being so placed relative to one another that each marginal edge of one of said tapes overlies at least a part of at least one narrow strip of solder on the other tape, applying flux to one of the two juxtaposed surfaces of the inner and outer tapes in the region of the coating as the outer tape is being applied to the inner, and first heating then cooling the assembly of inner and outer tapes in the region of the coating while the outer tape is held in place, the coating of solder being so thin and the quantity of flux being so small that by said heating and cooling the two tapes become soldered together along at least one continuous strip on each side of the abutting edges of the inner tape, wherein the coating of solder is produced by applying flux to a narrow strip of one surface of the tape, heating the tape and applying solder metal to the fluxed strip of surface of the heated tape by feeding an elongated element of solder metal endwise towards the hot fluxed strip of surface whilst causing the hot tape to travel forward in the direction of its length, the rate of feed of the element of solder metal towards the tape being co-ordinated with the rate of travel of the tape to maintain contact between the said element and the tape and control the rate of deposition of solder thereon.

9. A method as claimed in claim 8, wherein the tape is heated by passing it over a heated convex surface with that surface of the tape opposite the fluxed surface in contact with the heated surface.

10. A method as claimed in claim 9, wherein the solder element is fed to the tape at the trailing end of the heated surface.

11. A method of making a metal tube by progressively transversely bending an advancing metal tape to a tubular form in which its edges abut and holding it in such condition by progressively transversely bending a second advancing metal tape over the first said tape and soldering the outer tape to the inner tape, characterized in that the outer tape is prepared for soldering it to the inner tape by depositing an adherent coating of solder metal on each of a plurality of mutually spaced narrow strips of the outer tape before transversely bending it, that the prepared outer tape is applied to the inner tape to bring some of the solder coated strips on one side of the abutting edges of the inner tape and the remaining solder coated strips on the opposite side of said abutting edges, that, as the outer tape is being applied to the inner tape, flux is applied to one of said tapes in the region of each coating of solder on said outer tape, and that heat is applied to the assembly in the region of each coating of solder to melt the solder, the outer tape being held in place during this application of heat and afterwards until the solder has set, the coatings of solder being so thin and the quantity of flux applied being so small that the soldering of the inner and outer tapes is confined to a plurality of narrow bands extending the length of the tube, the number of said bands corresponding to the number of strips of solder applied to the outer tape.

References Cited in the file of this patent

UNITED STATES PATENTS

| | | |
|---|---|---|
| 993,195 | Phelps | May 23, 1911 |
| 995,589 | Eichmann | June 20, 1911 |
| 1,114,508 | Norton | Oct. 20, 1914 |
| 1,586,249 | Krogh | May 25, 1926 |
| 1,685,269 | Bundy | Sept. 25, 1928 |
| 1,918,197 | Sebell | July 11, 1933 |
| 2,210,338 | Quarnstrom | Aug. 6, 1940 |
| 2,234,450 | Quarnstrom | Mar. 11, 1941 |
| 2,255,472 | Quarnstrom | Sept. 9, 1941 |
| 2,258,681 | Hoglund | Oct. 14, 1941 |
| 2,296,435 | Giard | Sept. 22, 1942 |
| 2,336,544 | Hopfield | Dec. 14, 1943 |
| 2,475,566 | Karmazin | July 5, 1949 |